US010183675B2

(12) United States Patent
Nozaki

(10) Patent No.: US 10,183,675 B2
(45) Date of Patent: Jan. 22, 2019

(54) HYBRID VEHICLE AND METHOD OF CONTROLLING HYBRID VEHICLE

(71) Applicant: TOYOTA JIDOSHA KABUSHIKI KAISHA, Toyota-shi, Aichi-ken (JP)

(72) Inventor: Takeshi Nozaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/848,828

(22) Filed: Dec. 20, 2017

(65) Prior Publication Data

US 2018/0178806 A1 Jun. 28, 2018

(30) Foreign Application Priority Data

Dec. 22, 2016 (JP) ................................. 2016-249230

(51) Int. Cl.
| *B60W 30/192* | (2012.01) |
| *B60K 6/387* | (2007.10) |
| *B60W 50/14* | (2012.01) |
| *B60K 6/547* | (2007.10) |
| *B60W 10/02* | (2006.01) |

(Continued)

(52) U.S. Cl.
CPC .......... *B60W 30/192* (2013.01); *B60K 6/387* (2013.01); *B60K 6/547* (2013.01); *B60W 10/02* (2013.01); *B60W 10/026* (2013.01); *B60W 10/06* (2013.01); *B60W 10/08* (2013.01); *B60W 20/40* (2013.01); *B60W 20/50* (2013.01); *B60W 50/14* (2013.01); *B60K 2006/4825* (2013.01); *B60W 2050/022* (2013.01); *B60W 2510/08* (2013.01);

(Continued)

(58) Field of Classification Search
CPC .................... B60K 6/387; B60K 6/547; B60K 2006/4825; B60W 10/02; B60W 10/026; B60W 10/06; B60W 10/08; B60W 20/40; B60W 20/50; B60W 50/14; B60W 2050/022; B60W 2510/08; B60W 2520/10; B60W 2710/06; B60W 30/192
USPC .................................................. 180/65.265
See application file for complete search history.

(56) References Cited

U.S. PATENT DOCUMENTS

| 6,853,892 B2 * | 2/2005 | Baraszu | ................... B60K 6/48 701/22 |
| 9,415,676 B2 * | 8/2016 | Hori | ...................... B60W 20/40 |

(Continued)

FOREIGN PATENT DOCUMENTS

| JP | 2013-82404 | 5/2013 |
| JP | 2013-180645 A | 9/2013 |
| JP | 2013-180696 | 9/2013 |

*Primary Examiner* — John D Walters
(74) *Attorney, Agent, or Firm* — Finnegan, Henderson, Farabow, Garrett & Dunner, LLP

(57) ABSTRACT

In a hybrid vehicle, in order to start up an engine, an ECU executes one of first engine start-up control for starting up the engine using a starter motor and second engine start-up control for starting up the engine by coupling the engine to drive wheels using a clutch while the hybrid vehicle is traveling. The ECU notifies the user of information for prompting the user to stop the hybrid vehicle in a predetermined notification mode using a notification apparatus, when the ECU determines that the following conditions i) and ii) are both satisfied while the hybrid vehicle is performing electric traveling,
  i) a motor generator is in a malfunctioning state, and the engine needs to be started up, and
  ii) a vehicle speed is lower than a threshold.

9 Claims, 4 Drawing Sheets

(51) Int. Cl.
*B60W 10/06* (2006.01)
*B60W 10/08* (2006.01)
*B60W 20/40* (2016.01)
*B60W 20/50* (2016.01)
B60K 6/48 (2007.10)
B60W 50/02 (2012.01)

(52) U.S. Cl.
CPC ..... *B60W 2520/10* (2013.01); *B60W 2710/06* (2013.01)

(56) References Cited

U.S. PATENT DOCUMENTS

2013/0158838 A1* 6/2013 Yorke .................. B60W 10/06
 701/103
2016/0146128 A1* 5/2016 Tu ........................... F02D 37/02
 701/113

* cited by examiner

HYBRID VEHICLE AND METHOD OF CONTROLLING HYBRID VEHICLE

INCORPORATION BY REFERENCE

The disclosure of Japanese Patent Application No. 2016-249230 filed on Dec. 22, 2016 including the specification, drawings and abstract is incorporated herein by reference in its entirety.

BACKGROUND

1. Technical Field

The present disclosure relates to a hybrid vehicle including an engine and a motor that serve as drive sources, and relates also to a method of controlling the hybrid vehicle.

2. Description of Related Art

Hybrid vehicles including an engine and a motor that serve as drive sources are known. While a hybrid vehicle as described above is performing electric traveling, that is, while the hybrid vehicle is traveling using a motor as a drive source with an engine stopped, for example, a malfunction that leads to restriction of the use of the motor occurs in some cases. In such a case, the engine is started up, so that the hybrid vehicle can travel using the engine as a drive source.

For example, Japanese Unexamined Patent Application Publication No. 2013-180696 (JP 2013-180696 A) describes a hybrid vehicle including an engine and a motor that serve as drive sources. JP 2013-180696 A describes that, when the motor cannot be used or the use of the motor is restricted and the engine can be started up by a rotary driving force from the drive wheel-side based on a gear ratio and a clutch rotational speed, control for starting up the engine using a rotary driving force from the drive wheel-side is executed. JP 2013-180696 A describes also that, when the engine cannot be started up by a rotary driving force from the drive wheel-side, control for starting up the engine using a starter motor is executed.

SUMMARY

The starter motor is driven by electric power from an auxiliary battery. Thus, the voltage of the auxiliary battery temporarily drops while cranking of the engine is performed (i.e., while a crankshaft is rotated by the starter motor to start up the engine). This may exert an influence on the operations of other electrical devices that are operated by the electric power from the auxiliary battery. Therefore, for example, when an influence is exerted on the electrical devices that are operated while the vehicle is traveling, the traveling function may deteriorate, leading to deterioration of the drivability.

The present disclosure provides a hybrid vehicle including an engine and a motor that serve as drive sources, the hybrid vehicle being configured such that, when the use of the motor is restricted, the engine is started up at appropriate timing, and also provides a method of controlling the hybrid vehicle.

A first aspect of the disclosure relates to a hybrid vehicle. The hybrid vehicle includes an engine, drive wheels, a starter motor, an auxiliary battery, a motor generator, a clutch, a notification apparatus, and an electronic control unit. The starter motor is configured to start up the engine. The auxiliary battery is configured to supply electric power to auxiliary machines including the starter motor. The motor generator is configured to be coupled to the drive wheels. The clutch is configured to couple the engine and the drive wheels to each other. The notification apparatus is configured to notify a user of information regarding the hybrid vehicle. The electronic control unit is configured to execute one of first engine start-up control and second engine start-up control to start up the engine. The first engine start-up control is control for starting up the engine using the starter motor. The second engine start-up control is control for starting up the engine by coupling the engine and the drive wheels to each other using the clutch while the hybrid vehicle is traveling. The electronic control unit is configured to notify the user of information for prompting the user to stop the hybrid vehicle in a predetermined notification mode using the notification apparatus, when following conditions i) and ii) are both satisfied while the hybrid vehicle is performing electric traveling using the motor generator with the engine stopped, i) the electronic control unit determines that the motor generator is in a malfunctioning state, and the engine needs to be started up, and ii) the electronic control unit determines that a vehicle speed of the hybrid vehicle is lower than a threshold.

In this way, until the user stops the hybrid vehicle in accordance with the notification, start-up of the engine using the starter motor is suppressed. Thus, it is possible to suppress deterioration of the traveling function due to actuation of the starter motor while the hybrid vehicle is traveling. As a result, deterioration of the drivability can be reduced.

In the hybrid vehicle, the electronic control unit may be configured to execute the first engine start-up control when the hybrid vehicle stops after notification of the information is made using the notification apparatus.

In this way, the first engine start-up control is executed while the hybrid vehicle is at a standstill. Thus, it is possible to suppress deterioration of the traveling function due to actuation of the starter motor while the hybrid vehicle is traveling.

In the hybrid vehicle, the electronic control unit may be configured to notify the user of information for prompting the user to switch a shift position to a parking position, in addition to the information for prompting the user to stop the hybrid vehicle, in the predetermined notification mode using the notification apparatus, when the following conditions i) and ii) are both satisfied while the hybrid vehicle is performing the electric traveling, i) the electronic control unit determines that the motor generator is in the malfunctioning state, and the engine needs to be started up, and ii) the electronic control unit determines that the vehicle speed of the hybrid vehicle is lower than the threshold.

In this way, until the user stops the hybrid vehicle and switches the shift position to the parking position in accordance with the notification, start-up of the engine using the starter motor is suppressed. Thus, it is possible to suppress deterioration of the traveling function due to actuation of the starter motor while the hybrid vehicle is traveling.

In the hybrid vehicle, the electronic control unit may be configured to execute the first engine start-up control when the hybrid vehicle stops and the shift position is switched to the parking position after notification of the information is made using the notification apparatus.

In this way, the first engine start-up control is executed when the hybrid vehicle is at a standstill and the shift position has been switched to the parking position. Thus, it is possible to suppress deterioration of the traveling function due to actuation of the starter motor while the hybrid vehicle is traveling.

In the hybrid vehicle, the notification apparatus may include a display device provided at a position where the display device is seen from the user while the user is driving the hybrid vehicle. Further, the predetermined notification mode may include a notification mode of displaying prescribed textual information on the display device.

In this way, it is possible to prompt the user who is driving the hybrid vehicle to stop the hybrid vehicle and to switch the shift position to the parking position.

In the hybrid vehicle, the electronic control unit may be configured to execute the second engine start-up control when following conditions i) and iii) are both satisfied while the hybrid vehicle is performing the electric traveling, i) the electronic control unit determines that the motor generator is in the malfunctioning state, and the engine needs to be started up, and iii) the electronic control unit determines that the vehicle speed of the hybrid vehicle is equal to or higher than the threshold.

In this way, when the vehicle speed of the hybrid vehicle is equal to or higher than the threshold, it is possible to start up the engine without using the starter motor, by coupling the engine and the drive wheels to each other using the clutch.

The hybrid vehicle may further include a torque converter disposed between the engine and the drive wheels. The torque converter may be provided with a lock-up clutch. The electronic control unit may be configured to control the lock-up clutch such that the lock-up clutch enters a disengaged state when the electronic control unit executes the second engine start-up control.

In this way, the lock-up clutch enters the disengaged state, so that torque fluctuations that occur when the engine is started up can be absorbed by the torque converter. As a result, vibrations and a shock that occur during start-up of the engine are suppressed from being transmitted to the drive wheels.

The hybrid vehicle may further include: a power supply apparatus configured to supply electric power to the motor generator; a resolver configured to detect a rotational speed of the motor generator; and a current sensor configured to detect a current flowing from the power supply apparatus to the motor generator. The electronic control unit may be configured to determine that the motor generator is in the malfunctioning state, when the electronic control unit detects a failure in at least one of the power supply apparatus, the resolver, and the current sensor.

In this way, by detecting a failure in the power supply apparatus, the resolver, and the motor current sensor, it is possible to determine that the motor generator is in the malfunctioning state where the use of the motor generator is restricted.

A second aspect of the disclosure relates to a method of controlling a hybrid vehicle. The hybrid vehicle includes an engine, drive wheels, a starter motor, an auxiliary battery, a motor generator, a clutch, a notification apparatus, and an electronic control unit. The starter motor is configured to start up the engine. The auxiliary battery is configured to supply electric power to auxiliary machines including the starter motor. The motor generator is configured to be coupled to the drive wheels. The clutch is configured to couple the engine and the drive wheels to each other. The notification apparatus is configured to notify a user of information regarding the hybrid vehicle. The method includes: executing, by the electronic control unit, one of first engine start-up control and second engine start-up control to start up the engine; and notifying, by the notification apparatus, the user of information for prompting the user to stop the hybrid vehicle in a predetermined notification mode, when the following conditions i) and ii) are both satisfied while the hybrid vehicle is performing electric traveling using the motor generator with the engine stopped, i) the electronic control unit determines that the motor generator is in a malfunctioning state, and the engine needs to be started up, and ii) the electronic control unit determines that a vehicle speed of e hybrid vehicle is lower than a threshold.

The first engine start-up control is control for starting up the engine using the starter motor. The second engine start-up control is control for starting up the engine by coupling the engine and the drive wheels to each other using the clutch while the hybrid vehicle is traveling.

According to the present disclosure, it is possible to provide the hybrid vehicle including the engine and the motor that serve as drive sources, the hybrid vehicle being configured such that, when the use of the motor is restricted, the engine is started up at appropriate timing, and to provide the method of controlling the hybrid vehicle.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
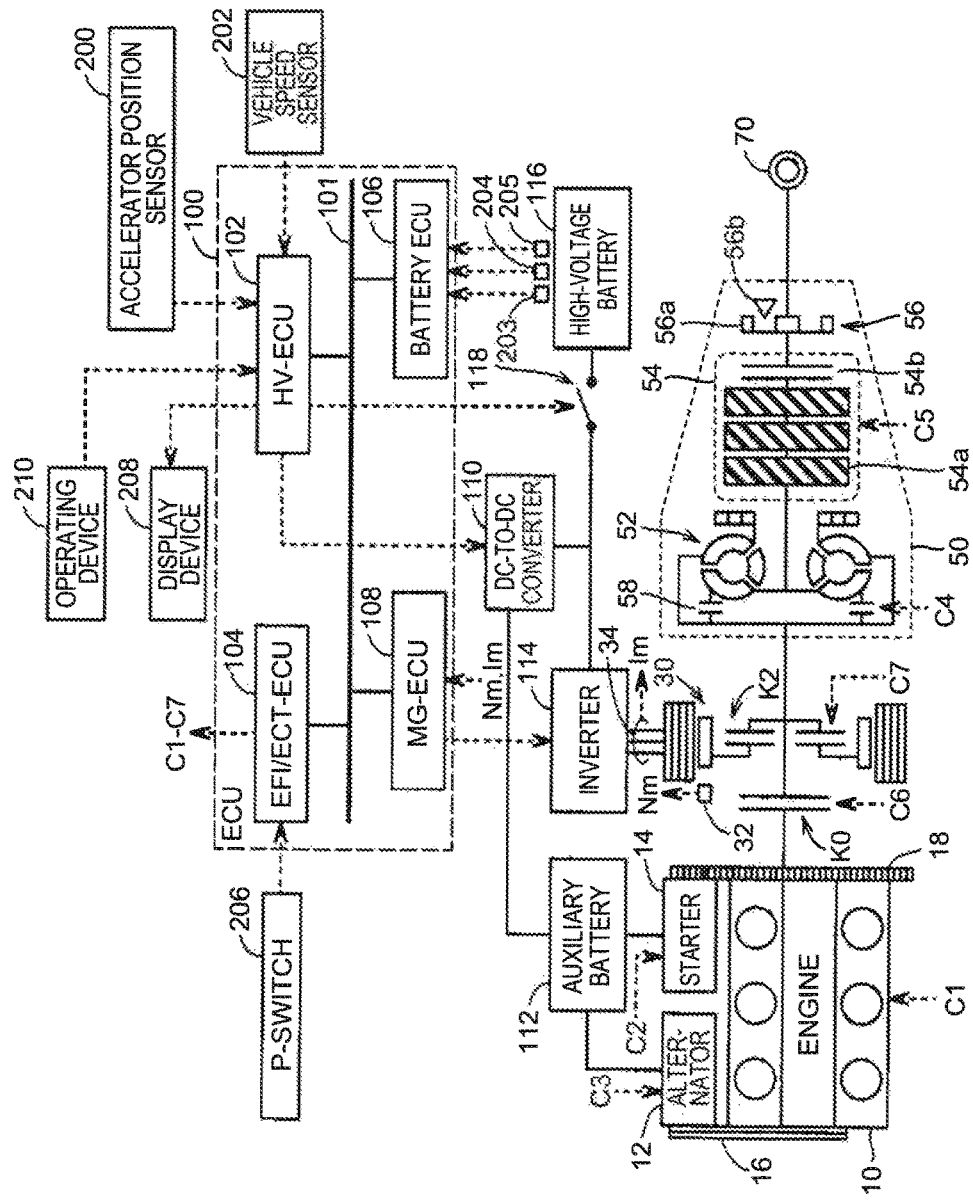
FIG. 1 is a diagram schematically illustrating the overall configuration of a hybrid vehicle according to the present embodiment.

Hereafter, embodiments of the present disclosure will be described in detail with reference to the accompanying drawings. Note that, the same or corresponding elements in the drawings will be denoted by the same reference symbols, and description thereof will not be repeated.

FIG. 1 is a diagram illustrating the overall configuration of a hybrid vehicle according to the present embodiment. A hybrid vehicle 1 (hereinafter, referred to as "vehicle 1") includes an engine 10, a motor generator (hereinafter, referred to as "MG") 30, an automatic transmission 50, drive wheels 70, a clutch K0, and a clutch K2.

The vehicle 1 travels using power from at least one of the engine 10 and the MG 30, which is transmitted to the drive wheels 70 via the automatic transmission 50.

An output shaft of the engine 10 is coupled to an input shaft of the automatic transmission 50 via the clutch K0. The rotor of the MG 30 is coupled to the input shaft of the automatic transmission 50 via the clutch K2. An output shaft of the automatic transmission 50 is coupled to the drive wheels 70 via a differential gear (not illustrated).

The clutch K0 is disposed between the output shaft of the engine 10 and the input shaft of the automatic transmission 50. The clutch K0 is switched from one of an engaged state and a disengaged state to the other one of the engaged state and the disengaged state, in response to a control signal C6 from an electronic control unit (ECU) 100 described later.

The clutch K2 is disposed between a rotary shaft of the MG 30 and the input shaft of the automatic transmission 50. The clutch K2 is switched from one of an engaged state and a disengaged state to the other one of the engaged state and the disengaged state, in response to a control signal C7 from the ECU 100.

The engine 10 is an internal combustion engine, such as a gasoline engine, or a diesel engine. While the clutch K0 is in the engaged state, the engine 10 can generate a rotational force for driving the vehicle 1 in response to a control signal C1 from the ECU 100 and output the rotational force to the input shaft of the automatic transmission 50. The engine 10 converts the energy generated by combustion of an air-fuel mixture of air and fuel into reciprocating motions of pistons, and then converts the reciprocating motions into a rotary motion using a crank mechanism and outputs the rotary motion to the crankshaft (output shaft).

The MG 30 is an alternating-current (AC) motor generator, such as a three-phase AC synchronous motor including a rotor and permanent magnets embedded in the rotor. While the clutch K2 is in the engaged state, the MG 30 can be driven by an inverter 114 described later to generate a rotational force for driving the vehicle 1, and output the rotational force to the input shaft of the automatic transmission 50. Alternatively, while the clutch K2 is in the engaged state, the MG 30 can generate electric power using the rotational force received from the input shaft of the automatic transmission 50 (the output from the engine 10, or the rotational force transmitted from the drive wheels 70 via the automatic transmission 50).

The automatic transmission 50 is configured to change the ratio (speed ratio) of a rotational speed of the input shaft of the automatic transmission 50 with respect to a rotational speed of the output shaft of the automatic transmission 50. The automatic transmission 50 may be a stepped automatic transmission configured to change the speed ratio in a stepwise manner, or may be a continuously variable automatic transmission.

The automatic transmission 50 includes a torque converter 52, speed-changing unit 54, and a parking lock mechanism 56.

The torque converter 52 is provided with a lock-up clutch LU. When the lock-up clutch LU is engaged, an input shaft and an output shaft of the torque converter 52 are directly coupled to each other, so that power is directly transmitted between the input shaft and the output shaft. When the lock-up clutch LU is disengaged, the input shaft and the output shaft of the torque converter 52, which have been directly connected to each other, are disconnected from each other, so that power is transmitted between the input shaft and the output shaft via components of the torque converter 52 (for example, a pump impeller, a turbine impeller, and a stator). The lock-up clutch LU operates in response to a control signal C4 from the ECU 100.

The speed-changing unit 54 includes, for example, a plurality of planetary gear mechanisms 54a, and frictional engaging devices 54b, such as clutches and brakes. The speed-changing unit 54 can achieve one of a plurality of shift speeds (for example, first to fourth shift speeds), by changing the combination of an engaged clutch and an engaged brake in response to a control signal C5 from the ECU 100.

The parking lock mechanism 56 is a mechanism that mechanically restricts the rotation of the output shaft of the automatic transmission 50 when the shift position is a parking position (hereinafter, referred to as "P-position").

The parking lock mechanism 56 includes a parking lock gear 56a and a lock pin 56b. The parking lock gear 56a is, for example, a gear that is provided on the output shaft or on a rotary shaft coupled to the output shaft via a gear or the like, and that has teeth on its outer periphery. The lock pin 56b is provided at a position at which the lock pin 56b faces the teeth of the parking lock gear 56a such that the lock pin 56b can be fitted between the teeth. When the P-position is selected by a P-switch 206 described later, the lock pin 56b is moved by an actuator (not illustrated) so as to be fitted between the teeth of the parking lock gear 56a. When the lock pin 56b is fitted between the teeth of the parking lock gear 56a, the rotation of the parking lock gear 56a, that is, the rotation of the output shaft is mechanically restricted.

The vehicle 1 including a drive apparatus as described above can travel using only the driving force generated by the MG 30, when the clutch K0 is disengaged (power transmission is interrupted) and the clutch K2 is engaged (power transmission is permitted). In the following description, a state where the vehicle 1 is traveling using only the driving force generated by the MG 30 with the engine 10 stopped will be referred to as "electric traveling".

On the other hand, the vehicle 1 can travel using only the driving force generated by the engine 10, when the clutch K0 is engaged (power transmission is permitted) and the clutch K2 is disengaged (power transmission is interrupted). In the following description, a state where the vehicle 1 is traveling using only the driving force generated by the engine 10 will be referred to as "engine-used traveling".

When the clutch K0 is engaged (power transmission is permitted) and the clutch K2 is engaged (power transmission is permitted), the vehicle 1 can travel using both the driving force generated by the engine 10 and the driving force generated by the MG 30, or the vehicle 1 can travel using the driving force generated by the engine 10 while the MG 30 generates electric power.

The engine 10 is provided with an alternator 12 and a starter motor 14 that serve as auxiliary machines. The alternator 12 is connected to the crankshaft of the engine 10 via a belt 16. The alternator 12 generates electric power for auxiliary machines (hereinafter, referred to as "auxiliary electric power"), using the power generated by the engine 10, based on a control signal C3 from the ECU 100. The alternator 12 supplies the generated auxiliary electric power to other auxiliary machines, or charges an auxiliary battery 112 (described later) with the generated auxiliary electric power.

The starter motor 14 is connected to the crankshaft of the engine 10 via a gear mechanism 18. The starter motor 14 generates a rotational force using the electric power from the auxiliary battery 112, based on a control signal C2 from the ECU 100. Cranking of the engine 10 can be performed as the generated rotational force is transmitted to the crankshaft via the gear mechanism 18. The gear mechanism 18 may be configured such that gears thereof are meshed with each other only during start-up of the engine 10, or may be configured such that the gears thereof are always meshed with each other.

The vehicle 1 further includes the ECU 100, a DC-to-DC converter 110, the auxiliary battery 112, the inverter 114, a high-voltage battery 116, a system main relay (hereinafter, referred to as "SMR") 118, the P-switch 206, a display device 208, and an operating device 210.

The high-voltage battery 116 is a rechargeable direct-current (DC) power supply. The high-voltage battery 116 is a power storage device including a secondary battery, such as a nickel-hydrogen battery or a lithium-ion battery. While the MG 30 is generating electric power, the high-voltage battery 116 is charged with the generated electric power received from the inverter 114. The voltage of the high-voltage battery 116 is, for example, approximately 200 V. Note that, in place of the high-voltage battery 116, a capacitor having a high capacity may be employed.

The SMR 118 is provided on an electric power line connecting the high-voltage battery 116 and the inverter 114 to each other. For example, when a user operates a power switch (not illustrated) with a brake pedal depressed, the SMR 118 enters an electric conduction state in response to a control signal from the ECU 100, and the vehicle 1 enters "ready-on state" in which the vehicle 1 is permitted to travel.

The inverter 114 converts direct-current (DC) electric power from the high-voltage battery 116 into alternating-current (AC) electric power based on a control signal from the ECU 100 and supplies the AC electric power to the MG 30, whereby power-driving of the MG 30 can be performed (i.e., the MG 30 can be driven to generate torque). Alternatively, the inverter 114 converts AC electric power (regenerative electric power) generated by the MG 30 into DC electric power and supplies the DC electric power to the high-voltage battery 116, whereby the high-voltage battery 116 is charged with the DC electric power. The inverter 114 is, for example, a bridge circuit including switching elements for three phases.

An input terminal of the DC-to-DC converter 110 is connected to an electric power line branching off from the electric power line connecting the inverter 114 to the high-voltage battery 116. An output terminal of the DC-to-DC converter 110 is connected to the auxiliary battery 112. The DC-to-DC converter 110 receives the DC electric power from the high-voltage battery 116 to generate auxiliary electric power based on a control signal from the ECU 100. The generated auxiliary electric power is supplied to other auxiliary machines, or used to charge the auxiliary battery 112. The DC-to-DC converter 110 is, for example, an isolated converter including a DC-to-AC converter circuit, a transformer, a rectifier circuit, and a smoothing circuit.

The auxiliary battery 112 is a rechargeable DC power supply. The auxiliary battery 112 is, for example, a power storage device including a lead-acid battery. The auxiliary battery 112 can supply electric power to the starter motor 14. The auxiliary battery 112 is charged with electric power received from the DC-to-DC converter 110 and/or the alternator 12. The voltage of the auxiliary battery 112 is, for example, approximately 12 V.

The P-switch 206 is a switch that is operated by the user to select the P-position as a shift position. In response to the user's operation of the P-switch 206, the P-switch 206 sends a signal indicating that the P-switch 206 is operated by the user to the ECU 100. In the present embodiment, shift positions include, for example, the P-position, a drive position (hereinafter, referred to as "D-position"), a reverse position, and a neutral position. The shift positions other than the P-position are selected, for example, by a shift lever (not illustrated).

The display device 208 displays information regarding the vehicle 1. The display device 208 is, for example, a liquid crystal display. The display device 208 executes a display process, for example, corresponding to a control signal from the ECU 100.

The operating device 210 is, for example, a touch panel provided on the liquid crystal display. In response to the user's touch operation, the operating device 210 sends an operation signal indicating information regarding the touch operation (for example, coordinates of a position on the touch panel, at which the user touches the touch panel) to the ECU 100.

A resolver 32, a motor current sensor 34, an accelerator position sensor 200, a vehicle speed sensor 202, a battery voltage sensor 203, a battery current sensor 204, and a battery temperature sensor 205 are all connected to the ECU 100.

The resolver 32 detects a rotational speed Nm of the MG 30 (hereinafter, referred to as "MG rotational speed"). The resolver 32 sends a signal indicating the detected MG rotational speed to the ECU 100.

The motor current sensor 34 detects a current Im for each phase, which flows between the inverter 114 and the MG 30. The motor current sensor 34 sends a signal indicating the detected current for each phase to the ECU 100.

The accelerator position sensor 200 detects a depression amount of an accelerator pedal (not illustrated). The accelerator position sensor 200 sends a signal indicating the detected depression amount of the accelerator pedal to the ECU 100.

The vehicle speed sensor 202 detects a speed of the vehicle 1 (hereinafter, referred to as "vehicle speed"). The vehicle speed sensor 202 may be a sensor configured to detect a rotational speed of the output shaft of the automatic transmission 50, or may be a sensor configured to detect a rotational speed of the drive wheels 70. In these cases, the vehicle speed can be calculated by the ECU 100, based on the detected rotational speed of the output shaft of the automatic transmission 50 or the detected rotational speed of the drive wheels 70.

The battery voltage sensor 203 detects a voltage of the high-voltage battery 116. The battery voltage sensor 203 sends a signal indicating the detected voltage to the ECU 100. The battery current sensor 204 detects a current of the high-voltage battery 116. The battery current sensor 204 sends a signal indicating the detected current to the ECU 100. The battery temperature sensor 205 detects a temperature of the high-voltage battery 116. The battery temperature sensor 205 sends a signal indicating the detected temperature to the ECU 100. The battery current sensor 204 is an example of a current sensor.

While the ECU 100 has been described as a control unit configured to collectively control the components described above and described as a receiving unit configured to collectively receive signals from the switches and the sensors. However, in more detail, the ECU 100 includes a plurality of ECUs that are respectively allocated, as control units or receiving units, for the individual components or fir the individual functions.

Various ECUs included in the ECU 100 each include a central processing unit (CPU), a read-only memory (ROM) configured to store processing programs and so forth, a random-access memory (RAM) configured to temporarily store data, an input-output port for receiving various signals and outputting various signals, and so forth (none of which are illustrated). The various ECUs are configured to execute controls of control targets corresponding respectively to the various ECUs, and configured to monitor monitoring targets corresponding respectively to the various ECUs.

Note that, the number of the ECUs, the names of the ECUs, and the functions allocated to the ECUs described below are just examples, and are not limited to the number, names and functions of the ECUs described below. For example, the ECU 100 may be one ECU having various functions.

In the present embodiment, the ECU 100 includes, for example, a hybrid vehicle (HV)-ECU 102, an electrical fuel injection (EFI)-electronic control transmission (ECT)-ECU 104, a battery ECU 106, and an MG-ECU 108.

Between the ECUs, communication (for example, controller area network (CAN) communication) is executed via a communication bus 101, and signals are sent and received as needed.

The HV-ECU 102 receives signals from the accelerator position sensor 200, the vehicle speed sensor 202, and the operating device 210. Moreover, the HV-ECU 102 controls operations of the DC-to-DC converter 110, the SMR 118, and the display device based on the received signals described above and signals received from the other ECUs. That is, the HV-ECU 102 generates control signals for the DC-to-DC converter 110, the SMR 118, and the display device based on the received signals, and sends the generated control signals to the corresponding control targets.

The EPI-ECT-ECU 104 receives a signal from the P-switch 206. Moreover, the EFI-ECT-ECU 104 controls operations of the engine 10 and the automatic transmission 50 based on the received signal described above and signals received from the other ECUs. That is, the EFI-ECT-ECU 104 generates the control signals C1 to C7 based on the received signals, and sends the generated control signals C1 to C7 to the corresponding control targets.

The battery ECU 106 receives signals from the battery voltage sensor 203, the battery current sensor 204, and the battery temperature sensor 205. The battery ECU 106 monitors the state of the high-voltage battery 116 (for example, a state of charge (SOC)) based on the received signals. Alternatively, the battery ECU 106 controls a cooling apparatus (not illustrated) for the high-voltage battery 116 based on the received signals described above and signals received from the other ECUs.

The MG-ECU 108 receives signals from the resolver 32 and the motor current sensor 34. Moreover, the MG-ECU 108 generates a control signal for the inverter 114 based on the received signals described above and signals received from the other ECUs, and sends the generated control signal to the inverter 114, thereby controlling the operation of the inverter 114.

In the vehicle 1 having the configuration as described above, when a malfunction occurs in the MG 30 during electric traveling and the use of the MG 30 is restricted, the ECU 100 can start up the engine 10 such that the vehicle 1 can perform engine-used traveling.

In order to start up the engine 10, the ECU 100 can execute one of first engine start-up control for starting up the engine 10 using the starter motor 14 and second engine start-up control for starting up the engine 10 by engaging the clutch K0 to couple the engine 10 and the drive wheels 70 to each other while the vehicle 1 is traveling.

However, the starter motor 14 is driven by electric power from the auxiliary battery 112. Thus, if the first engine start-up control is executed while the vehicle 1 is traveling, the voltage of the auxiliary battery 112 temporarily drops while cranking of the engine 10 is performed. This may exert an influence on other electrical devices that are operated by the electric power from the auxiliary battery 112. For example, when the voltage supplied to the various ECUs included in the ECU 100 temporary drops, the operations of the various ECUs may be reset. As a result, the traveling function may deteriorate, leading to deterioration of the drivability.

In view of this, in the present embodiment, in a case where the ECU 100 determines that a malfunction occurs in the MG 30 during electric traveling and the engine 10 needs to be started up, when the vehicle speed is lower than a threshold A, the ECU 100 notifies a user of a message prompting the user to stop the vehicle 1, by displaying prescribed textual information on the display device 208.

In this way, until the user stops the vehicle 1 in accordance with the displayed message, start-up of the engine 10 using the starter motor 14 is suppressed. Thus, it is possible to suppress deterioration of the traveling function due to actuation of the starter motor 14 while the vehicle 1 is traveling. As a result, deterioration of the drivability can be reduced.

Figure 2:
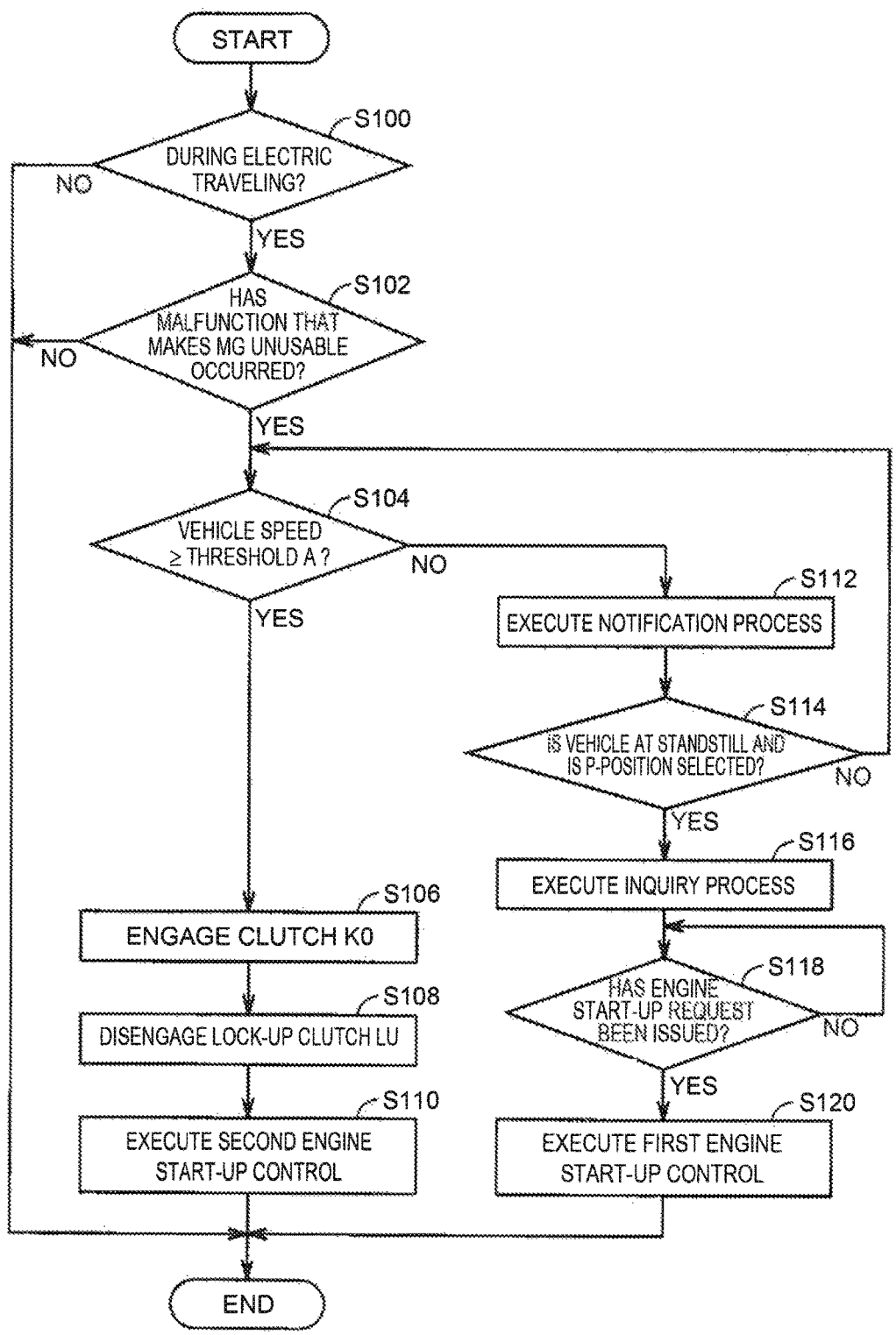
FIG. 2 is a flowchart illustrating control processes executed by an electronic control unit (ECU) mounted in the hybrid vehicle according to the present embodiment.

Hereafter, control processes executed by the ECU 100 will be described with reference to FIG. 2. FIG. 2 is a flowchart illustrating the control processes executed by the ECU 100 mounted in the vehicle 1 according to the present embodiment. In more detail, each of the following processes is executed by one of the ECUs included in the ECU 100. However, for convenience of description, the following description will be provided on the assumption that the ECU 100 collectively executes the following processes. The ECU 100 executes the following control processes at prescribed time intervals.

In step 100 (hereinafter, "step" will be referred to as "S"), the ECU 100 determines whether the vehicle 1 is performing electric traveling. The ECU 100 determines that the vehicle 1 is performing electric traveling, for example, when the engine 10 is at a standstill, the clutch K0 is disengaged, the clutch K2 is engaged, and electric power is supplied from the inverter 114 to the MG 30. When the ECU 100 determines that the vehicle 1 is performing electric traveling (YES in S100), the ECU 100 proceeds on to S102.

In S102, the ECU 100 determines whether a malfunction that makes the MG 30 unusable has occurred.

The ECU 100 determines that a malfunction that makes the MG 30 unusable has occurred, for example, when the ECU 100 detects the occurrence of a failure (i.e., detects the fact that a failure has occurred) in at least one of the resolver 32, the motor current sensor 34, and an electric power supply apparatus (including the inverter 114, the SMR 118, and the high-voltage battery 116) configured to supply electric power to the MG 30.

The ECU 100 detects the occurrence of a failure in the resolver 32, for example, when an output value from the resolver 32 is a value that cannot be observed at normal times. The ECU 100 detects the occurrence of a failure in the motor current sensor 34, for example, when an output value from the motor current sensor 34 is a value that cannot be observed at normal times. The ECU 100 detects the occurrence of a failure in the power supply apparatus, when the inverter 114 or the SMR 118 is not operating normally or when charging-discharging of the high-voltage battery 116 is restricted. The ECU 100 turns on a malfunction occurrence flag (i.e., places a malfunction occurrence flag in an ON-state), for example, when the ECU 100 detects the occurrence of a failure in at least one of the resolver 32, the motor current sensor 34, and the power supply apparatus. The ECU 100 determines that a malfunction that makes the MG 30 unusable has occurred, when the malfunction determination flag is in the ON-state.

When the ECU 100 determines that a malfunction that makes the MG 30 unusable has occurred (YES in S102), the ECU 100 proceeds on to S104.

In S104, the ECU 100 determines whether the vehicle speed is equal to or higher than the threshold A. The threshold A is, for example, a vehicle speed at which the second engine start-up control can be executed. The threshold A is not limited to any specific value, as long as the threshold A is a value at which the engine speed becomes equal to or higher than an engine speed that enables start-up of the engine 10, at least when the clutch K0 is in the engaged state. The threshold A may be, for example, a predetermined value or a value set based on a shift speed (i.e., speed ratio) achieved by the automatic transmission 50. When the ECU 100 determines that the vehicle speed is equal to or higher than the threshold A (YES in S104), the ECU 100 proceeds on to S106.

In S106, the ECU 100 executes control such that the clutch K0 enters the engaged state. The ECU 100 may control the engagement pressure for the clutch K0 such that a rate of change in the engine speed is constant, or may control the engagement pressure for the clutch K0 such that a rate of change in the hydraulic pressure is lower than that during engagement at normal times. In S108, the ECU 100 executes control such that the lock-up clutch LU enters the disengaged state. In S110, the ECU 100 executes the engine start-up control using a rotary driving force from the drive wheel-side (that is, the second engine start-up control).

Specifically, the ECU 100 executes fuel injection control and ignition control at timing at which the engine speed, which increases as engagement of the clutch K0 proceeds while the vehicle 1 is traveling, becomes equal to or higher than the engine speed that enables start-up of the engine 10. Note that, the ECU 100 may determine whether the timing, at which the engine speed becomes equal to or higher than the engine speed that enables start-up of the engine 10, has been reached, using a sensor (not illustrated) configured to detect an engine speed, or the ECU 100 may set the timing to a time point at which the time that has elapsed from the start of the engagement of the clutch K0 becomes equal to or longer than a predetermined time, and execute the fuel injection control and the ignition control at the timing.

In S112, the ECU 100 executes a notification process. The notification process includes, for example, a process of displaying, on the display device 208, textual information indicating a message prompting the user to stop the vehicle 1 and switch the shift position to the P-position, such as a message that "Stop the vehicle and press the P-switch".

In S114, the ECU 100 determines whether the vehicle 1 is at a standstill and the shift position is the P-position.

When the shift position has been switched to the P-position in response to an operation of the P-switch 206, the ECU 100 (more specifically, the EFI-ECT-ECU 104) turns on a flag indicating that the P-position has been selected. Therefore, when the vehicle speed is zero or is lower than the threshold A that is close to zero and this flag in the ON-state, the ECU 100 determines that the vehicle 1 is at a standstill and the shift position is the P-position. When the ECU 100 determines that the vehicle 1 is at a standstill and the shift position is the P-position (YES in S114), the ECU 100 proceeds on to S116.

In S116, the ECU 100 executes an inquiry process. The inquiry process includes, for example, a process of causing the display device 208 to display, on a display screen of the display device 208, textual information indicating that a malfunction has occurred in the MG 30, a process of displaying, on the display screen of the display device 208, textual information for inquiring of the user whether the engine 10 needs to be started up to continue traveling of the vehicle 1, and a process of displaying, on the display screen of the display device 208, an image indicating a confirmation button which can be selected with the use of the operating device 210.

In S118, the ECU 100 determines whether a request to start up the engine 10 has been issued. When the user performs an operation for selecting the confirmation button displayed on the display screen with the use of the operating device 210, the ECU 100 determines that a request to start up the engine 10 has been issued. When the ECU 100 determines that a request to start up the engine 10 has been issued (YES in S118), the ECU 100 proceeds on to S120.

In S120, the ECU 100 executes the engine start-up control using the starter motor 14 (that's, the first engine start-up control). Specifically, the ECU 100 drives the starter motor 14 to rotate the crankshaft of the engine 10. The ECU 100 executes the fuel injection control and the ignition control at timing at which the rotational speed of the crankshaft of the engine 10 (i.e., the engine speed) becomes equal to or higher than a rotational speed that enables start-up of the engine 10. Note that, the ECU 100 may determine whether the timing, at which the engine speed becomes equal to or higher than the engine speed that enables start-up of the engine 10, has been reached, using the sensor configured to detect an engine speed, or the ECU 100 may set the timing to a time point at which the duration of time over which the starter motor 14 is driven becomes equal to or longer than a predetermined time, and execute the fuel injection control and the ignition control at the timing.

Figure 3:
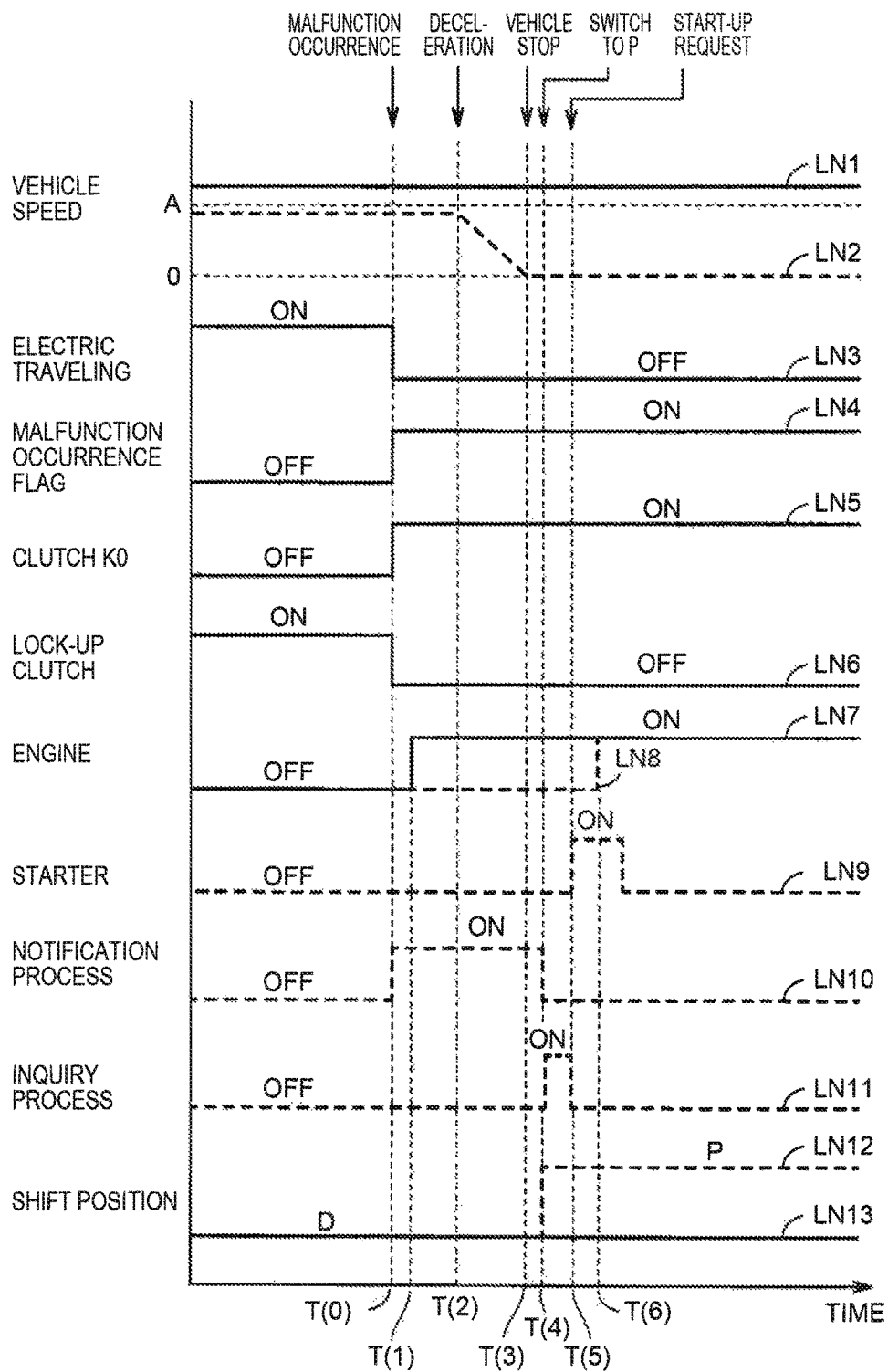
FIG. 3 is a time-series chart illustrating an operation of the ECU mounted in the hybrid vehicle according to the present embodiment.

The operation of the ECU 100 of the vehicle 1 according to the present embodiment based on the foregoing structure and flowchart will be described with reference to FIG. 3. FIG. 3 is a time-series chart illustrating an operation of the ECU 100 mounted in the vehicle 1 according to the present embodiment. The abscissa axis in FIG. 3 indicates time, and the ordinate axis in FIG. 3 indicates the vehicle speed, the selection state of electric traveling, the state of the malfunction occurrence flag, the state of the clutch K0, the state of the lock-up clutch LU, the presence or absence of actuation of the engine 10, the presence or absence of actuation of the starter motor 14, the presence or absence of execution of the notification process, the presence or absence of execution of the inquiry process, and the state of the shift position.

That is, LN1 and LN2 in FIG. 3 represent changes in the vehicle speed. LN3 in FIG. 3 represents a change in the selection state of electric traveling. LN4 in FIG. 3 represents a change in the state of the malfunction occurrence flag. LN5 in FIG. 3 represents a change in the state of the clutch K0. LN6 in FIG. 3 represents a change in the state of the lock-up clutch LU. LN7 and LN8 in FIG. 3 represent changes in the actuation state of the engine 10. LN9, in FIG. 3 represents a change in the actuation state of the starter motor 14. LN10 in FIG. 3 represents a change in the execution state of the notification process. LN11 in FIG. 3 represents a change in the execution state of the inquiry process. LN12 and LN13 in FIG. 3 represent changes in the shift position. Note that, LN2 and LN8 to LN12 indicated by dashed lines in FIG. 3 represent the changes that are observed when the vehicle speed is lower than the threshold A.

Hereinafter, the case where the vehicle speed is equal to or higher than the threshold A will be described. Description will be provided on the assumption that the vehicle 1 is performing electric traveling as indicated by LN3 in FIG. 3, and the vehicle speed is equal to or higher than the threshold A as indicated by LN1 in FIG. 3. In this case, the clutch K0 is in the OFF-state as indicated by LN5 in FIG. 3, the lock-up clutch LU is in the ON-state as indicated by LN6 in FIG. 3, and the engine 10 is kept at a standstill as indicated by LN7 in FIG. 3. Moreover, the D-position is selected as the shift position as indicated by LN13 in FIG. 3.

While the vehicle 1 is performing electric traveling (YES in S100), when the malfunction occurrence flag is turned on at time T(0) as indicated by LN4 in FIG. 3 due to a failure in at least one of the resolver 32, the motor current sensor 34, and the power supply apparatus, the ECU 100 determines that a malfunction that makes the MG 30 unusable has occurred (YES in S102).

When the ECU 100 determines that the vehicle speed is equal to or higher than the threshold A (YES in S104), the ECU 100 executes control such that the clutch K0 enters the engaged state as indicated by LN5 in FIG. 3 (S106), and executes control such that the lock-up clutch LU enters the disengaged state as indicated by LN6 in FIG. 3 (S108).

In this case, the ECU 100 executes the control for starting up the engine 10 using a rotary driving force from the drive wheel-side (that is, the second engine start-up control) (S110). In response to a start of the engagement of the clutch KU, a rotational force is transmitted from the drive wheels 70 to the crankshaft because the vehicle 1 is traveling. As a result, the crankshaft of the engine 10 is rotated. At time T(1) at which the predetermined time or longer has elapsed from the start of the engagement of the clutch KU, the engine speed becomes equal to or higher than the engine speed that enables start-up of the engine 10 and the fuel injection control and the ignition control are executed. As a result, the engine 10 enters the actuated state at time T(1), as indicated by LN7 in FIG. 3.

The engine start-up control using a rotary driving force from the drive wheel-side (that is, the second engine start-up control) is executed, and thus the starter motor 14 is maintained in the OFF-state.

Hereinafter, the case where the vehicle speed is lower than the threshold A will be described. Description will be provided on the assumption that the vehicle 1 is performing electric traveling as indicated by LN3 in FIG. 3, and the vehicle speed is lower than the threshold A as indicated by LN2 in FIG. 3. In this case, the clutch KU is in the OFF-state, the lock-up clutch LU is in the ON-state, and the engine 10 is kept at a standstill as indicated by LN8 in FIG. 3. Moreover, the D-position is selected as the shift position as indicated by LN12 in FIG. 3.

While the vehicle 1 is performing electric traveling (YES in S100), when the malfunction occurrence flag is turned on at time T(0) as indicated by LN4 in FIG. 3 due to a failure in at least one of the resolver 32, the motor current sensor 34, and the power supply apparatus, the ECU 100 determines that a malfunction that makes the MG 30 unusable has occurred (YES in S102).

When the ECU 100 determines that the vehicle speed is lower than the threshold A (NO in S104), the ECU 100 executes the notification process as indicated by LN10 in FIG. 3 (S112).

At time T(2), the user depresses a brake pedal in accordance with the notification, so that the vehicle 1 starts to decelerate. After the vehicle 1 stops at time T(3), when the P-position is selected (YES in S114) at time T(4) as indicated by LN12 in FIG. 3 in response to the user's operation of the P-switch 206, the ECU 100 executes the inquiry process (S116) as indicated by LN11 in FIG. 3.

When the user performs an operation for selecting the confirmation button displayed on the display screen in response to the inquiry process, thereby issuing a request to start up the engine 10 (YES in S118) at time T(5), the ECU 100 executes the engine start-up control using the starter motor 14 (that is, the first engine start-up control) (S120).

The starter motor 14 is driven, and the rotational speed of the crankshaft of the engine 10 increases. At time T(6), the engine speed becomes equal to or higher than the engine speed that enables start-up of the engine 10, and the fuel injection control and the ignition control are executed. As a result, as indicated by LN8 in FIG. 3, the engine 10 enters the actuated state. After that, the starter motor 14 is turned off (i.e., placed in the OFF-state).

The engine start-up control using the starter motor 14 (that is, the first engine start-up control) is executed, and thus the clutch K0 is maintained in the OFF-state.

As described above, in the vehicle 1 according to the present embodiment, when a malfunction that makes the MG 30 unusable occurs while the vehicle 1 is performing electric traveling and the vehicle speed is lower than the threshold A, the ECU 100 executes the notification process of prompting a user who is driving the vehicle 1 to stop the vehicle 1 and to select the P-position, using the display device 208. Therefore, start-up of the engine 10 using the starter motor 14 is suppressed, until the user stops the vehicle 1 and selects the P-position in accordance with the notification. Thus, it is possible to suppress deterioration of the traveling function due to actuation of the starter motor 14 while the vehicle 1 is traveling. As a result, deterioration of the drivability can be reduced. Consequently, it is possible to provide the hybrid vehicle including the engine and the motor that serve as drive sources and configured such that, when the use of the motor is restricted, the engine is started up at appropriate timing.

Furthermore, when a malfunction that makes the MG 30 unusable occurs while the vehicle 1 is performing electric traveling and the vehicle speed is equal to or higher than the threshold A, the engine 10 can be started up by engaging the clutch K0 without using the starter motor 14. In this case, the clutch K0 is engaged and the lock-up clutch LU is disengaged, so that torque fluctuations that occur when the engine 10 is started up can be absorbed by the torque converter 52. As a result, vibrations and a shock that occur during start-up of the engine 10 are suppressed from being transmitted to the drive wheels 70.

Furthermore, by detecting a failure in the power supply apparatus, the resolver 32, and the motor current sensor 34, it is possible to determine that the MG 30 is in a malfunctioning state where the use of the MG 30 is restricted.

Hereafter, modified examples will be described. In the foregoing embodiment, selecting the P-position with the use of the P-switch 206 is described as one example. Alternatively, the P-position may be selected, for example, with the use of a shift lever (not illustrated).

In the foregoing embodiment, the ECU 100 including the NV-ECU 102, the EFI-ECT-ECU 104, the battery ECU 106, and the MG-ECU 108 is described as one example. Alternatively, the ECU 100 may further include a power steering ECU configured to control a power steering apparatus, or a brake ECU configured to control a brake actuator used for an antilock brake system (ABS).

In the foregoing embodiment, the case where a notification is provided to the user with the use of the display device 208 when the notification process is executed is described as one example. Alternatively, a notification may be provided to the user, for example, by voice output from a speaker.

In the foregoing embodiment, when a malfunction that makes the MG 30 unusable occurs while the vehicle 1 is performing electric traveling, the notification process or the second engine start-up control is executed depending on the vehicle speed. Alternatively, when a malfunction that restricts the use of the MG 30 occurs while the vehicle 1 is performing electric traveling, the notification process or the second engine start-up control may be executed depending on the vehicle speed. Malfunctions that restrict the use of the MG 30 include, in addition to a malfunction that makes the MG 30 unusable, a malfunction in which an output or an upper limit of torque becomes lower than a normal value due to a physical malfunction, such as vibration, a malfunction in an electric system, or the like.

In the foregoing embodiment, when the vehicle 1 stops and the P-position is selected, after the notification process is executed, the user's confirmation regarding start-up of the engine 10 is obtained through the inquiry process, and then, the engine 10 is started up using the starter motor 14. However, the procedure is not limited to this. For example, when the vehicle 1 stops and the P-position is selected after the notification process is executed, the engine 10 may be started up using the starter motor 14 without obtaining the user's confirmation.

Figure 4:
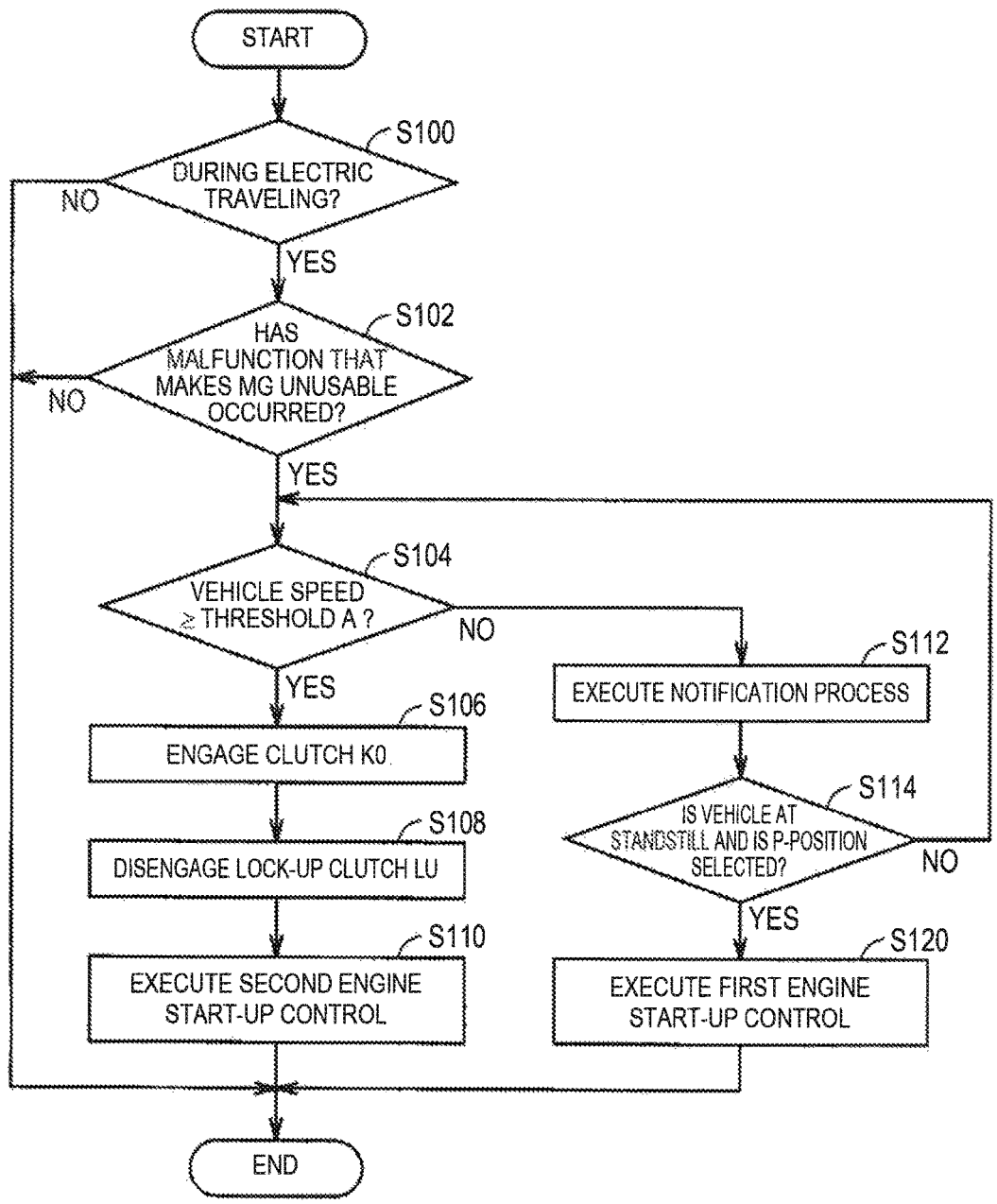
FIG. 4 is a flowchart illustrating control processes executed by the ECU mounted in the hybrid vehicle according to a modified example.

The ECU 100 may implement the foregoing operation by executing the control processes illustrated in a flowchart in FIG. 4. FIG. 4 is the flowchart illustrating the control processes executed by the ECU 100 mounted in the hybrid vehicle 1 according to a modified example.

The flowchart in FIG. 4 indicates the same processes as those in the flowchart in FIG. 2, except that the inquiry process (S116) and the process of determining whether a request to start up the engine 10 has been issued (S118) are excluded from the flowchart in FIG. 4. The processes that are illustrated in the flowchart in FIG. 4 and that are the same as those illustrated in the flowchart in FIG. 2 are denoted by the same step numbers as those in FIG. 2. Therefore, the detailed description of the processes illustrated in the flowchart in FIG. 4 will not be repeated.

In this case as well, when a malfunction that makes the MG 30 unusable occurs while the vehicle 1 is performing electric traveling and the vehicle speed is lower than the threshold A, the ECU 100 executes the notification process. Therefore, start-up of the engine 10 using the starter motor 14 is suppressed, until the user stops the vehicle 1 and selects the P-position in accordance with the notification. Thus, it is possible to suppress deterioration of the traveling function due to actuation of the starter motor 14 while the vehicle 1 is traveling. As a result, deterioration of the drivability can be reduced.

Note that, all or part of the foregoing modified examples may be appropriately combined and implemented. The embodiments disclosed here should be construed to be exemplary and not to be restrictive in all respects. The scope of the present disclosure is defined by the appended claims rather than by the foregoing description, and all changes which come within the meaning and range of equivalency of the claims are therefore intended to be embraced therein.

What is claimed is:

1. A hybrid vehicle comprising:
an engine;
drive wheels;
a starter motor configured to start up the engine;
an auxiliary battery configured to supply electric power to auxiliary machines including the starter motor;
a motor generator configured to be coupled to the drive wheels;
a clutch configured to couple the engine and the drive wheels to each other;
a notification apparatus configured to notify a user of information regarding the hybrid vehicle; and
an electronic control unit configured to execute one of first engine start-up control and second engine start-up control to start up the engine, the first engine start-up control being control for starting up the engine using the starter motor, and the second engine start-up control being control for starting up the engine by coupling the engine and the drive wheels to each other using the clutch while the hybrid vehicle is traveling, and
the electronic control unit being configured to notify the user of information for prompting the user to stop the hybrid vehicle in a predetermined notification mode using the notification apparatus, when following conditions i) and ii) are both satisfied while the hybrid vehicle is performing electric traveling using the motor generator with the engine stopped,
i) the electronic control unit determines that the motor generator is in a malfunctioning state, and the engine needs to be started up, and
ii) the electronic control unit determines that a vehicle speed of the hybrid vehicle is lower than a threshold.

2. The hybrid vehicle according to claim 1, wherein the electronic control unit is configured to execute the first engine start-up control when the hybrid vehicle stops after notification of the information is made using the notification apparatus.

3. The hybrid vehicle according to claim 2, further comprising a torque converter disposed between the engine and the drive wheels, the torque converter being provided with a lock-up clutch,
wherein the electronic control unit is configured to control the lock-up clutch such that the lock-up clutch enters a disengaged state when the electronic control unit executes the second engine start-up control.

4. The hybrid vehicle according to claim 1, wherein
the electronic control unit is configured to notify the user of information for prompting the user to switch a shift position to a parking position, in addition to the information for prompting the user to stop the hybrid vehicle, in the predetermined notification mode using the notification apparatus, when the following conditions i) and ii) are both satisfied while the hybrid vehicle is performing the electric traveling,
i) the electronic control unit determines that the motor generator is in the malfunctioning state, and the engine needs to be started up, and
ii) the electronic control unit determines that the vehicle speed of the hybrid vehicle is lower than the threshold.

5. The hybrid vehicle according to claim 4, wherein the electronic control unit is configured to execute the first engine start-up control when the hybrid vehicle stops and the shift position is switched to the parking position after notification of the information is made using the notification apparatus.

6. The hybrid vehicle according to claim 1, wherein
the notification apparatus includes a display device provided at a position where the display device is seen from the user while the user is driving the hybrid vehicle, and
the predetermined notification mode includes a notification mode of displaying prescribed textual information on the display device.

7. The hybrid vehicle according to claim 1, wherein the electronic control unit is configured to execute the second engine start-up control when following conditions i) and iii) are both satisfied while the hybrid vehicle is performing the electric traveling,
i) the electronic control unit determines that the motor generator is in the malfunctioning state, and the engine needs to be started up, and
iii) the electronic control unit determines that the vehicle speed of the hybrid vehicle is equal to or higher than the threshold.

8. The hybrid vehicle according to claim 1, further comprising:
- a power supply apparatus configured to supply electric power to the motor generator;
- a resolver configured to detect a rotational speed of the motor generator; and
- a current sensor configured to detect a current flowing from the power supply apparatus to the motor generator,
- wherein the electronic control unit is configured to determine that the motor generator is in the malfunctioning state, when the electronic control unit detects a failure in at least one of the power supply apparatus, the resolver, and the current sensor.

9. A method of controlling a hybrid vehicle, the hybrid vehicle including an engine, drive wheels, a starter motor, an auxiliary battery, a motor generator, a clutch, a notification apparatus, and an electronic control unit,
- the starter motor being configured to start up the engine, the auxiliary battery being configured to supply electric power to auxiliary machines including the starter motor, the motor generator being configured to be coupled to the drive wheels, the clutch being configured to couple the engine and the drive wheels to each other, and the notification apparatus being configured to notify a user of information regarding the hybrid vehicle, the method comprising:
- executing, by the electronic control unit, one of first engine start-up control and second engine start-up control to start up the engine, the first engine start-up control being control for starting up the engine using the starter motor, and the second engine start-up control being control for starting up the engine by coupling the engine and the drive wheels to each other using the clutch while the hybrid vehicle is traveling; and
- notifying, by the notification apparatus, the user of information for prompting the user to stop the hybrid vehicle in a predetermined notification mode, when following conditions i) and ii) are both satisfied while the hybrid vehicle is performing electric traveling using the motor generator with the engine stopped,
  - i) the electronic control unit determines that the motor generator is in a malfunctioning state, and the engine needs to be started up, and
  - ii) the electronic control unit determines that a vehicle speed of the hybrid vehicle is lower than a threshold.

* * * * *